United States Patent
Massari et al.

(10) Patent No.: US 11,613,637 B2
(45) Date of Patent: Mar. 28, 2023

(54) PERMEABLE POLYMER FILM

(71) Applicant: BASELL POLIOLEFINE ITALIA S.R.L., Milan (IT)

(72) Inventors: Paola Massari, Ferrara (IT); Andrea Felisati, Ferrara (IT); Marco Izzi, Frankfurt (DE); Paolo Bassi, Ferrara (IT); Caroline Cathelin, Ferrara (IT); Michele Grazzi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 180 days.

(21) Appl. No.: 16/647,652

(22) PCT Filed: Aug. 30, 2018

(86) PCT No.: PCT/EP2018/073312
§ 371 (c)(1),
(2) Date: Mar. 16, 2020

(87) PCT Pub. No.: WO2019/052821
PCT Pub. Date: Mar. 21, 2019

(65) Prior Publication Data
US 2020/0277478 A1 Sep. 3, 2020

(30) Foreign Application Priority Data
Sep. 14, 2017 (EP) .................... 17190989

(51) Int. Cl.
B32B 27/08 (2006.01)
B32B 27/32 (2006.01)
C08J 5/18 (2006.01)
C08L 23/12 (2006.01)

(52) U.S. Cl.
CPC .............. C08L 23/12 (2013.01); B32B 27/08 (2013.01); B32B 27/32 (2013.01); C08J 5/18 (2013.01); B32B 2250/40 (2013.01); C08J 2323/12 (2013.01); C08J 2423/16 (2013.01); C08L 2203/16 (2013.01); C08L 2207/02 (2013.01)

(58) Field of Classification Search
None
See application file for complete search history.

(56) References Cited

U.S. PATENT DOCUMENTS

| | | | |
|---|---|---|---|
| 6,348,271 B1 | 2/2002 | Nakata et al. | |
| 8,829,113 B2* | 9/2014 | Gaddi | C08L 23/12 525/191 |
| 10,316,122 B2* | 6/2019 | Massari | C08F 4/65912 |
| 10,494,517 B1* | 12/2019 | Cathelin | C08F 4/52 |
| 2005/0137336 A1 | 6/2005 | Su et al. | |
| 2006/0199891 A1 | 9/2006 | Sugita et al. | |
| 2011/0065865 A1* | 3/2011 | Bokhari | C08L 23/10 525/99 |
| 2013/0211011 A1* | 8/2013 | Gaddi | C08L 23/12 525/240 |

FOREIGN PATENT DOCUMENTS

| | | |
|---|---|---|
| CN | 102639309 A | 8/2012 |
| CN | 105593287 A | 5/2016 |
| CN | 105745269 A | 7/2016 |
| EP | 0873862 A2 | 10/1998 |
| EP | 0877052 A2 | 11/1998 |
| EP | 2821434 A1 | 1/2015 |
| WO | 2005090467 A1 | 9/2005 |
| WO | 2008074715 A1 | 6/2008 |

OTHER PUBLICATIONS

Monomer Sequence Distribution in Ethylene-Proylene Rubber Measured By 13C NMR. 3. Use of Reaction Probability Mode C.J. Carman, R. A. Harrington and C.E. Wilkes, Macromolecules, 1977.
Carbon-13 NMR Determination of Monomer Sequence Distribution in Ethylene-Propylene Copolymers Prepared With Titanium Trichloride-Diethylaluminum Chloride M. Kakugo, Y. Naito, K. Mizunuma and T. Miyatake, Macromolecules, 1982, 15, 1150.
International Search Report and Written Opinion dated Oct. 12, 2018 for Corresponding PCT/EP2018/073312.

* cited by examiner

*Primary Examiner* — Sheeba Ahmed

(57) ABSTRACT

A multilayer film made from or containing at least one core layer made from or containing a polypropylene composition made from or containing:
A) from 95 wt % to 60 wt %; of a propylene homopolymer having a fraction insoluble in xylene at 25° C. greater than 90 wt %, based upon the total weight of the propylene homopolymer; and
B) from 5 wt % to 40 wt %; of an heterophasic propylene ethylene copolymer, the sum of the amounts of A) and B) being 100.

9 Claims, No Drawings

PERMEABLE POLYMER FILM

This application is the U.S. National Phase of PCT International Application PCT/EP2018/073312, filed Aug. 30, 2018, claiming benefit of priority to European Patent Application No. 17190989.8, filed Sep. 14, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polymer film, including polymers films for food packaging.

BACKGROUND OF THE INVENTION

In some instances, polypropylene films as well as biaxially oriented polypropylene films (BOPP) are used for the packaging of foodstuff using automatic machines. In some instances, the films have a good balance of processability ("machinability"), optical and mechanical properties, and low permeability to gases and water vapor. In some instances, the gases are oxygen or carbon dioxide.

For the packaging of fresh foods, greater gas transmission rates are sought. Because the metabolic activity of vegetable cells continues after fresh foods are harvested, cleaned and cut into pieces, the cells of the fresh foods continue consuming oxygen and emitting carbon dioxide and water vapor. In a closed package, this process changes the environment inside the package, making the environment detrimental for the metabolic activity yet favorable for the development of harmful micro-organisms.

In some instances, the oxygen and water vapor transmission rate of films made form or containing propylene homopolymers are low and can be increased.

SUMMARY OF THE INVENTION

In a general embodiment, the present disclosure provides a multilayer film made from or containing at least one core layer made from or containing a polypropylene composition made from or containing:

A) from 95 wt % to 60 wt %; of a propylene homopolymer having a fraction insoluble in xylene at 25° C. greater than 90 wt %, based upon the total weight of the propylene homopolymer; and B) from 5 wt % to 40 wt %; of a heterophasic propylene ethylene copolymer having:

i) xylene soluble fraction at 25° C. ranging from 52 wt % to 74 wt %, based upon the total weight of the heterophasic propylene ethylene copolymer;

ii) intrinsic viscosity of the fraction soluble in xylene at 25° C. ranging from 2.5 to 5 dl/g;

iii) melt flow rate, MFR, measured according to ISO 1133 at 230° C. with a load of 2.16 kg, ranging from 0.2 g/10 min to 1.5 g/10 min;

iv) flexural modulus lower than 300 MPa, and v) an ethylene derived units content ranging from 10 wt % to 30 wt %, based upon the total weight of the heterophasic propylene ethylene copolymer;

the sum of the amounts of A) and B) being 100.

DETAILED DESCRIPTION OF THE INVENTION

In some embodiments, the present disclosure provides a multilayer film made from or containing at least one core layer made from or containing a polypropylene composition made from or containing:

A) from 95 wt % to 60 wt %; alternatively from 90 wt % to 70 wt %; alternatively from 85 wt % to 75 wt % of a propylene homopolymer having a fraction insoluble in xylene at 25° C. greater than 90 wt %; alternatively greater than 94 wt %, based upon the total weight of the propylene homopolymer; and B) from 5 wt % to 40 wt %; alternatively from 10 wt % to 30 wt %; alternatively from 15 wt % to 35 wt % of an heterophasic propylene ethylene copolymer having:

i) xylene soluble fraction at 25° C. ranging from 52 wt % to 74 wt %; alternatively from 55 wt % to 70 wt %; alternatively from 61 wt % to 67 wt %, based upon the total weight of the heterophasic propylene ethylene copolymer;

ii) intrinsic viscosity of the fraction soluble in xylene at 25° C. ranging from 2.5 to 5 dl/g; alternatively from 2.8 to 4.5 dl/g; alternatively from 3.0 to 3.8 dl/g;

iii) melt flow rate, MFR, measured according to ISO 1133 at 230° C. with a load of 2.16 kg, ranging from 0.2 g/10 min to 1.5 g/10 min; alternatively from 0.4 g/10 min to 1.0 g/10 min; alternatively from 0.4 g/10 min to 0.8 g/10 min;

iv) flexural modulus lower than 300 MPa, alternatively lower than 200 MPa; and v) an ethylene derived units content ranging from 10 wt % to 30 wt % alternatively from 13 wt % to 25 wt %, based upon the total weight of the heterophasic propylene ethylene copolymer;

the sum of the amounts of A) and B) being 100.

As used herein, the term "copolymer" refers to polymers containing two kinds of comonomers. In some embodiments, the comonomers are propylene and ethylene.

As used herein, the term "core layer" refers to the layer in a multilayer film having no contact with the external environment. For example, in a three-layer A/B/A film, the B layer is the core layer.

In some embodiments, the multilayer films have at least one core layer made from or containing the polypropylene composition. In some embodiments, the remaining layers are formed of another material for use in multilayer films or in laminated products. In some embodiments, each layer is made from or containing a polypropylene homopolymer or copolymer or a polyethylene homopolymer or copolymer or another polymer. In some embodiments, the other polymer is EVA.

The combination and number of layers of the multilayer structures described are not limited. In some embodiments, the multilayer structure is made from or containing 3-11 layers or more, alternatively 3-9 layers, alternatively 3-7 layers, alternatively 3-5 layers, with combinations including A/B/A, A/B/C, AB/CB/A, and A/B/C/D/C/B/A, provided that at least one core layer such as B or D is made from or containing a propylene composition.

In some embodiments, the number of layers of the multilayer film is 3 or 5, wherein at least one core layer is made from or containing a propylene composition. In some embodiments, the structures are A/B/A or A/B/C, wherein B is a propylene composition.

In some embodiments, component A is a homopolymer of propylene available commercially as Moplen HP522H, Moplen HP520H, Moplen HP525J, or Moplen HP526J.

In some embodiments, component B) is a heterophasic propylene ethylene copolymer available commercially as Adflex Q100F.

In some embodiments, the film layers further contain additives for use in film manufacturing, alternatively for use in films for packaging applications with automatic machines. In some embodiments, the additives are selected from the group consisting of anti-oxidants, process stabilizers, slip agents, antistatic agents, antiblock agents, and antifog agents.

In some embodiments and independently from the structure of the film, the overall film thickness is from 9 to 100 microns, the thickness of the layer(s) A) is from 0.5 to 20 microns, and that of the layer(s) B) is from 9.5 to 99.5 microns. In some embodiments, layer(s) B is used as an inner layer(s).

In some embodiments, the films are produced by extrusion processes.

In the extrusion processes, the polymer materials to be used for the various layers are molten in different extruders and extruded through a narrow die gap. In some embodiments, after exiting from the die, the material is cooled, heated and optionally oriented in several ways or in combination. In some embodiments, the processes are selected from the group consisting of cast, blown, extrusion coating, uniaxially oriented, simultaneously biaxially oriented, and sequential biaxially oriented film processes.

In some embodiments, the processes are selected from the group consisting of blown film and BOPP processes.

Blown Film

The molten polymer materials are forced through a circular shaped die.

The extrudate which is drawn off has the shape of a tube, which is inflated by air to form a tubular bubble. The bubble is cooled and collapsed before winding-up.

In some embodiments, the blown film process is for the preparation of the film.

BOPP

The molten polymer materials are forced continuously through a narrow die. The extruded molten material is pulled away from the die and cooled, then heated again and stretched both in the Machine Direction (MD) and in the Transverse Direction (TD). After the stretching process, the film is cooled and then wound-up.

The following examples are given to illustrate, not to limit, the present invention:

EXAMPLES

Xylene-soluble (XS) Fraction at 25° C.

Solubility in xylene at 25° C.: Determined as follows:

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25° C. for 30 minutes. The resulting solid was filtered on quick filtering paper. 100 ml of the filtered liquid was poured in a pre-weighed aluminum container, which was heated on a heating plate under nitrogen flow to remove the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

Melt Flow Rate (MFR)

Measured according to ISO 1133 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket, which permitted temperature control with a circulating thermostatic liquid. The downward passage of the meniscus was timed by a photoelectric device.

The passage of the meniscus in front of the upper lamp started the counter, which had a quartz crystal oscillator. The counter stopped as the meniscus passed the lower lamp and the efflux time was registered. The efflux time was converted into a value of intrinsic viscosity through Huggins' equation (Huggins, M. L., J. Am. Chem. Soc., 1942, 64, 2716, based upon the flow time of the solvent at the same experimental conditions (same viscometer and same temperature). A single polymer solution was used to determine [η].

Ethylene Content in the Copolymers $^{13}$C NMR spectra were acquired on a Bruker AV-600 spectrometer equipped with cryoprobe, operating at 160.91 MHz in the Fourier transform mode at 120° C.

The peak of the Sββ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as an internal reference at 29.9 ppm. The samples were dissolved in 1,1,2,2-tetrachloroethane-d2 at 120° C. with an 8% wt/v concentration. Each spectrum was acquired with a 90° pulse, and 15 seconds of delay between pulses and CPD to remove $^{1}$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

PPP = 100 T$\beta\beta$/S  PPE = 100 T$\beta\delta$/S  EPE = 100 T$\delta\delta$/S
PEP = 100 S$\beta\beta$/S  PEE = 100 S$\beta\delta$/S  EEE = 100 (0.25 S$\gamma\delta$ + 0.5 S$\delta\delta$)/S
S = T$\beta\beta$ + T$\beta\delta$ + T$\delta\delta$ + S$\beta\beta$ + S$\beta\delta$ + 0.25 S$\gamma\delta$ + 0.5 S$\delta\delta$ The molar percentage of ethylene content was evaluated using the following equation:

$$E\% \text{ mol} = 100*[PEP+PEE+EEE]$$

The weight percentage of ethylene content was evaluated using the following equation:

$$E\% \text{ mol}*MWE$$

$$E\% \text{ wt.} = E\% \text{ mol}*MWE + P\% \text{ mol}*MWP$$

where P % mol is the molar percentage of propylene content, while MWE and MWP are the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1 r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mmT$_{\beta\beta}$ (28.90-29.65 ppm) and the whole T$_{\beta\beta}$ (29.80-28.37 ppm).

Flexural Modulus

Flexural Modulus was measured according to ISO 178, and supplemental conditions according to ISO 1873-2 on an injection molded sample Measurements on Films Oxygen Transmission (OTR)

Measured on a Mocon OX-TRAN 2/60 unit, commercially available from Mocon, Inc., according to ASTM D3985-05(2010)e1 at 23° C., 0% relative humidity (RH), and 100% 02.

Water Vapor Transmission (WVTR)

Measured on a Mocon PERMATRAN W3/33 unit, commercially available from Mocon, Inc. according to ASTM F1249 at 37.8° C. and 90% relative humidity (RH).

Component A

Component A was Moplen HP522H propylene homopolymer, commercially available from LyondellBasell, having a MFR of 2.0 g/10 min and a solubility in xylene at 25° C. of 4.9 wt %.

Component B

For component B, 1B) was Adflex C200F heterophasic propylene copolymer, commercially available from LyondellBasell; and 2B) was Adflex Q100F heterophasic propylene copolymer, commercially available form LyondellBasell;

the properties of components 1B) and 2B) are reported in Table 1.

TABLE 1

|  |  | Adflex C200F - 1B) | Adflex Q100F - 2B) |
|---|---|---|---|
| Ethylene content | Wt % | 14.9 | 20.1 |
| Xylene soluble at 25° C. | Wt % | 51.2 | 64 |
| Intrinsic viscosity xylene solubles | dl/g | 2.24 | 3.27 |
| Flexural modulus | MPa | 200 | 98 |

Examples 1-3 and Comparative Examples 1-4

Components A and B were blended in various percentages, as reported in Table 2:

TABLE 2

| components |  | Comp 1 | Ex 1 | Comp 2 | Ex 2 | Comp 3 | Ex 3 | Comp 4 |
|---|---|---|---|---|---|---|---|---|
| A | Wt % | 80 | 80 | 70 | 70 | 60 | 60 | 100 |
| B1 | Wt % | 20 |  | 30 |  | 40 |  |  |
| B2 | Wt % |  | 20 |  | 30 |  | 40 |  |

BOPP A/B/A films were produced. The B layer was made with the compositions of Examples 1-3 and Comparative Examples 1-4, while the A layer was made with Moplen HP522H propylene homopolymer. The thickness of the films was 30 microns, with the A layer being 1 micron. The results of the analysis of the films are reported in Table 3.

TABLE 3

| components |  | Comp 1 | Ex 1 | Comp 2 | Ex 2 | Comp 3 | Ex 3 | Comp 4 |
|---|---|---|---|---|---|---|---|---|
| WVTR | cc/m² × day | 5.13 | 6.1 | 6.44 | 6.5 | 6.99 | 8.7 | 3.2 |
| OTR | cc/m² × day | 2252 | 2525 | 2394 | 3307 | 3359 | 4884 | 1697 |
| Tear resistance | N | 0.17 | 0.23 | 0.21 | 0.23 | 0.26 | 0.23 | 0.18 |

What is claimed is:

1. A multilayer film comprising:
   at least one core layer comprising
   a polypropylene composition comprising
   A) from 95 wt % to 60 wt %; of a propylene homopolymer having a fraction insoluble in xylene at 25° C. greater than 90 wt %, based upon the total weight of the propylene homopolymer; and
   B) from 5 wt % to 40 wt %; of a heterophasic propylene ethylene copolymer having:
      i) xylene soluble fraction at 25° C. ranging from 52 wt % to 74 wt %, based upon the total weight of the heterophasic propylene ethylene copolymer;
      ii) intrinsic viscosity of the fraction soluble in xylene at 25° C. ranging from 2.5 to 5 dl/g;
      iii) melt flow rate, MFR, measured according to ISO 1133 at 230° C. with a load of 2.16 kg, ranging from 0.2 g/10 min to 1.5 g/10 min;
      iv) flexural modulus lower than 300 MPa; and
      v) an ethylene derived units content ranging from 10 wt % to 25 wt %, based upon the total weight of the heterophasic propylene ethylene copolymer;
   the sum of the amounts of A) and B) being 100.

2. The multilayer film according to claim 1, wherein the propylene composition comprises from 90 wt % to 70 wt % of component A) and from 10 wt % to 30 wt % of component B).

3. The multilayer film according to claim 1, wherein the propylene composition comprises from 85 wt % to 75 wt % of component A) and from 15 wt % to 35 wt % of component B).

4. The multilayer film according to claim 1, wherein in component B), the xylene soluble fraction at 25° C. ranges from 55 wt % to 70 wt %, based upon the total weight of the heterophasic propylene ethylene copolymer.

5. The multilayer film according to claim 1, wherein in component B), the intrinsic viscosity of the fraction soluble in xylene at 25° C. ranges from 2.8 to 4.5 dl/g.

6. The multilayer film according to claim 1, wherein in component B), the melt flow rate, MFR, measured according to ISO 1133 at 230° C. with a load of 2.16 kg, ranges from 0.4 g/10 min to 1.0 g/10 min.

7. The multilayer film according to claim 1, wherein in component B), the flexural modulus is lower than 200 MPa.

8. The multilayer film according to claim 1, wherein in component B), the ethylene derived units content ranges from 13 wt % to 25 wt %, based upon the total weight of the heterophasic propylene ethylene copolymer.

9. The multilayer film according to claim 1, wherein in component A) the fraction insoluble in xylene at 25° C. is greater than 94 wt %.

* * * * *

UNITED STATES PATENT AND TRADEMARK OFFICE
CERTIFICATE OF CORRECTION

PATENT NO. : 11,613,637 B2  
APPLICATION NO. : 16/647652  
DATED : March 28, 2023  
INVENTOR(S) : Massari et al.

Page 1 of 1

It is certified that error appears in the above-identified patent and that said Letters Patent is hereby corrected as shown below:

In the Specification

In Column 2, Line 60, delete "AB/CB/A," and insert -- A/B/C/B/A, --, therefor

Signed and Sealed this  
Fourteenth Day of January, 2025

Derrick Brent  
*Acting Director of the United States Patent and Trademark Office*